United States Patent
Carlson

[15] 3,659,183
[45] Apr. 25, 1972

[54] POLARITY CONTROL SYSTEM
[72] Inventor: Arthur E. Carlson, Newton, Iowa
[73] Assignee: Winpower Manufacturing Company
[22] Filed: Dec. 4, 1970
[21] Appl. No.: 95,264

[52] U.S. Cl. ................................. 320/25, 320/48, 307/86, 307/127
[51] Int. Cl. .......................................... H02j 7/00
[58] Field of Search ................. 320/22, 25, 26, 48; 307/86, 307/127; 317/39

[56] References Cited

UNITED STATES PATENTS

| | | | |
|---|---|---|---|
| 3,281,816 | 10/1966 | Raymond | 320/25 UX |
| 3,308,365 | 3/1967 | St. John | 320/25 |
| 3,267,301 | 8/1966 | Gignac | 320/25 X |
| 3,341,762 | 9/1967 | Rockoff | 320/25 X |
| 3,343,057 | 9/1967 | Smith | 320/25 X |

Primary Examiner—William M. Shoop, Jr.
Assistant Examiner—Robert J. Hickey
Attorney—Molinare, Allegretti, Newitt & Witcoff

[57] ABSTRACT

A system for controlling the transmission of electrical power between a D.C. power source and a load. The system includes a circuit having indicator lamps for visually indicating the polarity of the power source and of the load. Relays are utilized to prevent power transmission when the source and the load are improperly connected to the circuit. The circuit includes normally closed contacts of one relay in series with the coil thereof and a resistor in parallel with the normally closed contacts so that when the coil is energized, the voltage applied to the coil is automatically reduced during operation.

6 Claims, 3 Drawing Figures

Patented April 25, 1972

INVENTOR.
ARTHUR E. CARLSON
BY Molinare, Allegretti
Newitt & Witcoff
ATTORNEYS 3,659,183

POLARITY CONTROL SYSTEM

BACKGROUND OF THE INVENTION

This invention relates generally to an electrical power transmission control circuit. As heretofore well known in the art, numerous devices such as heavy construction equipment, road vehicles, farm implements and motor powered boats require a supply of electrical power generally in the form of a battery for starting the engines which drive these devices. When the energy level of such a battery is low or when the engines of the various devices are cold and have not been used for a time, the electrical power from the battery is often insufficient to perform the required task.

To supply the energy required, jumper cables are often used to connect a power source to the battery or electrical load which is to be energized. This connection must be made accurately with the positive pole of the load connected to the positive pole of the power source and the negative pole of the load connected to the negative pole of the power source. If a mistake is made in the connection, the results range from adverse to disasterous. For example, a battery may be damaged, the electrical jumper cables may be destroyed or the power source may be damaged. Also, the operator connecting the jumper cables and others in proximity to the operation may be seriously injured by a short in the electrical system which can cause electrical arcing.

Accordingly, it is desirable to provide an electrical control system which will allow safe transmission of electrical power from a source to a load. It is also desirable to provide such a device which will be simple and economic to construct and operate.

SUMMARY OF THE INVENTION source

In a principal aspect, the present invention takes the form of an electrical circuit for controlling the transmission of power from a power source to an electrical load. The circuit includes means responsive to the polarity of the source and the load for conducting power from the source to the load only when both the source and the load are connected with predetermined polarities to the circuit. The circuit also includes means for indicating the polarity of both the source and the load.

According to a further feature of the invention, a manually operable switch means is provided to circumvent the load polarity responsive means so that when the load has no detectable polarity, power may still be transmitted thereto from the power source. According to another feature of the invention, a second manually operable switch is provided as a safety measure to prevent power transmission until the operator actuates the second switch. The specific means used to control the conducting of power from the source to the load include a number of relays. The means for indicating the polarity of the source and the load include a number of diodes and indicating lamps, placed in parallel across the input and output ports of the control circuit.

BRIEF DESCRIPTION OF THE DRAWINGS

These and other features and objects of the invention may be more clearly understood through a study of a detailed description which follows. During the course of this description, reference will frequently be made to the attached drawings in which.

DETAILED DESCRIPTION OF THE PREFERRED EMBODIMENT

Figure 1:
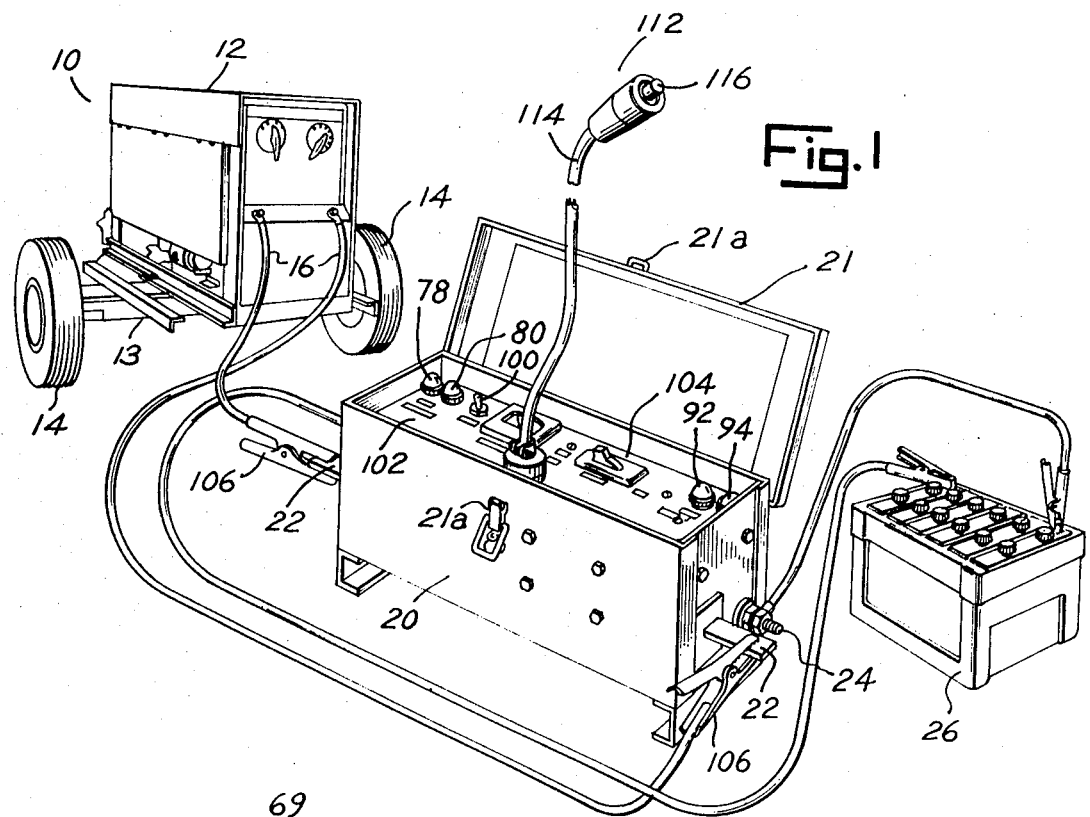
FIG. 1 is a perspective view of the electrical power supply, electrical load and the power transmission control system of this invention.

Referring now to FIG. 1, of a power source in the form of a D.C. arc welder 10 is shown. The welder 10 is of the type commonly used in the construction industry and is but one example of an electrical D.C. power source which may be used in this invention. The welder 10 is enclosed by a hood 12 and is supported by a chassis 13 and wheels 14. The welder 10 is provided with electrically conductive output cables 16 extending outwardly from the welder. The D.C. power transmission control circuit (not shown in FIG. 1) is enclosed in a light-weight, portable housing 20 which may be formed of heavy gauge steel and coated with enamel to enhance its appearance. The housing 20 includes a hinged lid 21 connected thereto and a latch mechanism 21a for securing the lid 21.

Extending outwardly from either side of the housing 20 are electrically conductive input bus bars 22 which are also connected to the input port of the power transmission control circuit (not shown in FIG. 1). Also extending outwardly from the sides of the housing 20 are electrically conductive output terminals 24. It is to be understood that the output terminal 24 on the left side of the housing 20 is identical to the output terminal 24 on the right side, although the left output terminal 24 does not appear in FIG. 1.

The electrical load shown in FIG. 1 is a battery 26 although the load may also take other forms, for example, the electrical starting system of a vehicle (not shown). It should also be noted that the electrical power source which takes the form of a D.C. welder 10 in FIG. 1 may be substituted by other devices, for example, a booster battery (not shown).

Figure 2:
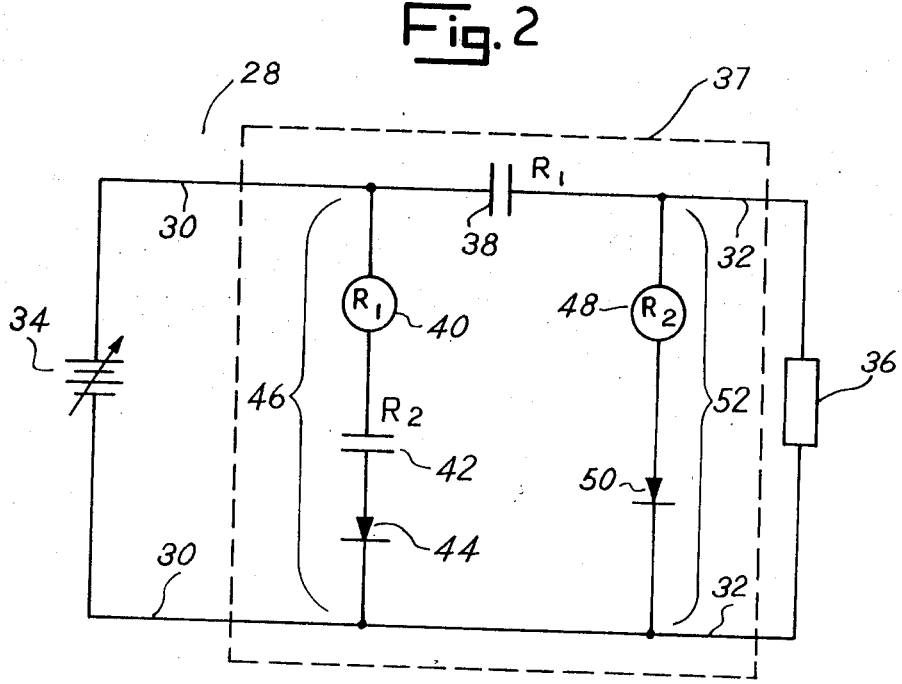
FIG. 2 is a circuit diagram of one simplified electrical circuit employing the features of this invention.

Referring generally to the simplified circuit diagram shown in FIG. 2, a power control circuit 28 is shown. The circuit includes an input port having upper and lower input terminals 30 and an output port having upper and lower output terminals 32. Connected in parallel to the input terminals 30 is a variable D.C. voltage source 34. An electrical load 36 is in parallel with the output terminals 32. As has been explained previously, the power source 34 may take the form of the D.C. arc welder 10 and the electrical load 36 may take the form of the battery 26.

The circuit 28 includes a means 37 responsive to the polarities of the load 36 and the source 34 for conducting power therebetween only when the load 36 and source 34 are connected to the circuit 28 with predetermined polarities. The polarity responsive means 37 utilizes relays R1 and R2. Contacts 38 of relay R1 are in series between the upper input terminal 30 and upper output terminal 32. The solenoid 40 of Relay R1 is connected in series with contacts 42 of the relay R2 and diode 44. The series connected solenoid 40, contacts 42 and diode 44 form a branch 46 which is connected in parallel with source 34 across input terminals 30. The solenoid 48 of relay R2 is in series with a diode 50 to form a branch 52 which is in parallel with the load 36 across output terminals 32.

Because of the polarity of diode 50, no current will flow through the solenoid 48 of relay R2 until the load 36 is correctly aligned with its positive pole connected to the upper terminal 32 and its negative pole 32 connected to the lower terminal 32. Therefore, the solenoid 40 of relay R1, in series with the normally open contacts 42 of relay R2 cannot be energized until the load 36 is properly connected. After load 36 is properly connected, contacts 38 of relay R1 remain open until the source 34 is properly connected because diode 44 allows only unidirectional current in branch 46. Accordingly, both the source 34 and the load 36 must have corresponding polarities before the circuit 28 will conduct power therebetween.

Figure 3:
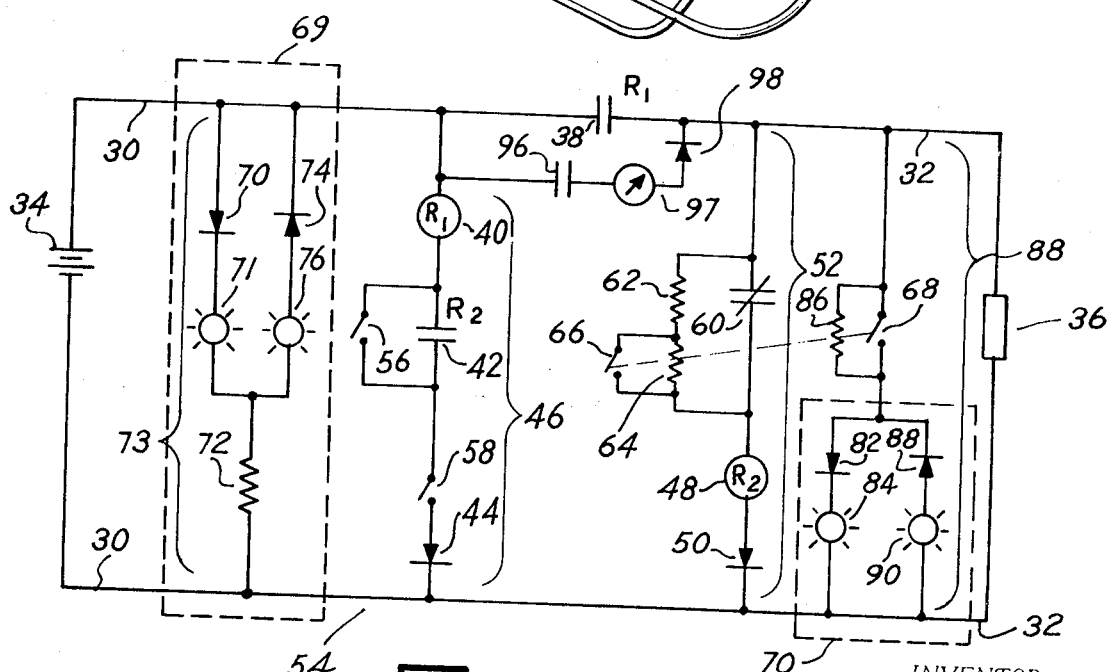
FIG. 3 is a circuit diagram of a second preferred embodiment of a circuit employing the features of this invention.

A second circuit 54 employing the principals of this invention is shown in FIG. 3. The elements of circuit 54 which are identical to those of FIG. 2 will be described with identical numerals. Branch 46 includes, in addition to solenoid 40 of relay R1, contacts 42 of relay R2, and diode 44, a manually operable switch 56 in parallel with contacts 42 and a manually operable switch 58 in series in branch 46. The switch 56 is provided to circumvent the contacts 42 of relay R2 when the voltage of the load 36 is undetectable as for example in the case of a battery having little or no energy. The switch 58 is provided to allow an operator final discretion as to whether the circuit between the load 36 and source 34 should be completed.

Branch 52 in addition to the solenoid 48 and diode 50 also includes normally closed contacts 60 of relay R2 in series in the branch 52 and a pair of series connected resistors 62 and 64 in parallel across the contacts 60. A manually operable switch 66 is in parallel across the resistor 64 and is mechanically linked to a switch 68 which will be more fully described below. After the solenoid 48 of relay R2 is energized by the properly connected load 36, the normally closed contacts 60 of relay R2 open and channel current through resistors 62 and 64, thus reducing the voltage applied to the solenoid 48 during operation.

The circuit 54 also includes means 69 for indicating the polarity of the power source 34 and a means 70 for indicating the polarity of the load 36. The indicator means 69 in part takes the form of a diode 70, indicator lamp 71 and resistor 72, all in series to form a branch 73. The branch 73 is in parallel with the power source 34 across input terminals 30. A series connected diode 74 and indicator lamp 76 are connected in parallel across the diode 70 and lamp 71 with diode 74 being poled oppositely to diode 70. As may be seen, when the positive pole of source 34 is connected to the upper input terminal 30, indicator lamp 71 will be energized. When the connection is reversed, indicator lamp 76 is energized.

Referring to the tool box 20 shown in FIG. 1, the lamps 71 and 76 are color coded for greater convenience. For example, lamp 71 may have a green translucent plastic cap 78 to show a correct connection and lamp 76 may have a red translucent plastic cap 80 to show an incorrect connection.

The indicator means 70 is similar to indicator means 69 and includes a diode 82, an indicator lamp 84 and a resistor 86 series connected to form a branch 88. The branch 88 is in parallel with the load 36 across the output terminals 32. A series connected diode 88 and indicator lamp 90 are in parallel across diode 82 and lamp 84 with diode 88 being oppositely poled to diode 82. The resistor 86 is in parallel with the switch 68. As may be seen, when the load 36 is correctly connected to the circuit 54 with its positive pole corresponding to the upper terminal 32, indicator lamp 84 will be energized. When the connection is reversed, lamp 90 is energized.

Referring to the tool box 20 shown in FIG. 1, the lamps 84 and 90 may be color coded. For example, lamp 84 may have a green translucent plastic cap 92 to show a correct connection and lamp 90 may have a red translucent plastic cap 94 to show an incorrect connection.

The mechanically linked switches 66 and 68 are provided to match the voltage of source 34 to the voltage of load 36. The switches 66 and 68 cooperate with the resistors 62, 64 and 86 to allow the circuit to be operated with loads having different voltage ratings.

As an added feature of this invention, a circuit breaker or toggle switch 96 is shown in series with an ammeter 97 and a diode 98. These series connected elements are in parallel across the contacts 38 of relay R1 with the diode 98 poled to conduct current from source 34 to the load 36. As may be seen, these elements circumvent the requirements of relay R1. Accordingly, the circuit may be used with a load 36, having no voltage at all and the current supplied to such a system may be easily monitored.

While in the foregoing descriptions of the circuits 28 and 54 sufficient to make and use the same have been made, a description of the method of use of the circuit 54 will be detailed for greater clarity.

The circuit 54 may be used in a variety of applications such as (1) in a normal vehicle starting operation, (2) to start a vehicle having a dead battery or having no battery at all and (3) to charge a battery. In order to start a vehicle, the mechanically linked switches 66 and 68 may be operated by a toggle 100 shown on the control panel 102 of the tool box 20. The toggle should be set to the voltage of the vehicle electrical system which is the electrical load 36. The circuit breaker 96 is operated by a second toggle 104 and should be open or in the "off" position. In order to start the power transmission, the D.C. arc welder 10 or other power supply should be connected to the input terminals 30 of the circuit 54. This can be done by connecting the jaws 106 of the output cables 16 to the input bus bars 22 of the tool box 20. Assuming that the positive terminal of the power source 34 is connected to the upper input terminal 30 of the circuit 54, a current will be conducted through the diode 70, indicator lamp 71 and resistor 72. The green cap 78 is illuminated if the connection is correct and the red cap 80 is illuminated if the connection is incorrect.

After the correct polarity connection of the power source 34 is established, the electrical load 36 is connected to the circuit. Assuming that the load has a detectable voltage, a correct connection will illuminate green cap 92 and an incorrect connection will illuminate red cap 94.

In the practical operation of the circuit 54, a push-button control 112 is provided to operate the switch 58. The push-button control 112 is connected through a control cable 114 to the control panel 102. A button 116 biases switch 58 to prevent the transmission of power between the source 34 and the load 36. When button 116 is depressed, the normally open switch 58 is closed. Until the button 116 is depressed, no current will flow through the solenoid 40 of the relay R1. The relay contacts 38 of relay R1 will remain open preventing power transmission.

When the operator wishes to start a vehicle he connects the vehicle electrical system and the power source to the circuit 54 as has been described. Having done this, he may take the push-button control 112 to the vehicle, energize the starter of the vehicle (not shown) and then depress the push-button 116. If the starter fails to operate, the push-button 116 should be released and the starting circuit de-energized. A higher setting should then be made on the power source 34 and the operation repeated until the vehicle commences to function.

The process for starting a vehicle with a dead battery or with no battery at all is as follows. Mechanically linked switches 66 and 68 should be set at the voltage at the vehicle electrical system. The circuit breaker 96 should be off. The power source 34 should be connected to the circuit 54 as has been previously explained. Since the vehicle to be started has a dead battery or no battery at all, there will be no detachable polarity from the load 36. Therefore, the load polarity indicating means 70 will be inoperative and the polarity of the load 36 must be carefully checked by the operator. Next the operator should take the push-button control device 112 with him to the vehicle. Because no current is developed from the load 36, no current will flow through the solenoid 48 of the relay R2 and the contacts 42 of the relay R2 will remain open. Therefore, a second operator should be stationed at the toggle 100 to close the manually operable switch 56 which acts to circumvent the open contacts 42. The operation should then be repeated as described above until the engine starts.

In the battery charging operation, the mechanically linked switches 66 and 68 should be set at the voltage of the battery 26 to be charged. The circuit breaker 96 should be off. Next the battery 26 and power source 34 should be connected to the circuit 54 as previously described. The power source should be operated at a low setting and the circuit breaker 96 should then be closed by operating the toggle 104. In this manner there is no need for the relay contacts 38 of relay R1 to be closed and, therefore, the push-button 116 need not be depressed. Thus the operator is not required to expend unnecessary effort during the time consuming battery charging operation. This operation is intended to deliver a partial charge to a low charged battery, and to enable the operator to monitor the current delivered thereto.

The foregoing description of this invention is meant to be illustrative of the principles of this invention. It is to be understood that other embodiments may be made according to the principles of this invention without departing from the true spirit and scope thereof.

What is claimed is:

1. A circuit for controlling the of electrical energy from a D.C. power source to an electrical load comprising, in combination:

an input port adapted for electrical connection to said D.C. power source having a first input terminal and a second input terminal;

an output port adapted for electrical connection to said load, having a first output terminal and a second output terminal;

a first relay having a relay coil in series with a first diode, said series connected first relay coil and first diode being connected across said input port between said first input terminal and said second input terminal, said first diode being poled to conduct current only from said first input terminal to said second input terminal, said first relay also having a pair of normally open contacts connected between said first input terminal and said first output terminal;

a second relay having a coil connected in series with a second diode, said series connected coil of said second relay and said second diode being connected in parallel across said output part between said first output terminal and said second output terminal, said second diode being poled to conduct current only from said first output terminal toward said second output terminal, said second relay also having a first pair of normally open contacts in series with the coil of said first relay, and a second pair of normally closed contacts connected in series with the coil of said second relay; and at least one resistor connected in parallel across the second pair of normally closed contacts of said second relay such that when said load and said D.C. power source are correctly connected to said circuit, the coil of said second relay is energized and said second pair of normally closed contacts in series with said coil of said second relay open to reduce the voltage applied to the coil of said second relay and the pair of normally open contacts of said second relay are closed to allow flow of current through the coil of said first relay to thereby energize the coil of said first relay and close the normally open contacts of said first relay connected between said first input terminal and said first output terminal for conducting power therethrough.

2. The circuit as set forth in claim 1 including means for indicating the polarity of said power source when said source is connected across said input port.

3. The circuit as set forth in claim 1 including means for indicating the polarity of said load when said load is connected to said output port.

4. A circuit as set forth in claim 1 including manually operable means for circumventing the coil of said second relay such that power may be conducted to said load when said load has no detectable voltage thereacross.

5. The circuit as set forth in claim 1 including a switch biased to prevent conducting the transmission of power from said source to said load until said biased switch is actuated.

6. The combination as set forth in claim 5 including a toggle switch for conducting power between said source and said load when said switch is actuated.

* * * * *